Feb. 10, 1959  A. J. M. LAURENT  2,872,962
SHOCK CUSHIONING WHEEL
Filed Oct. 30, 1956
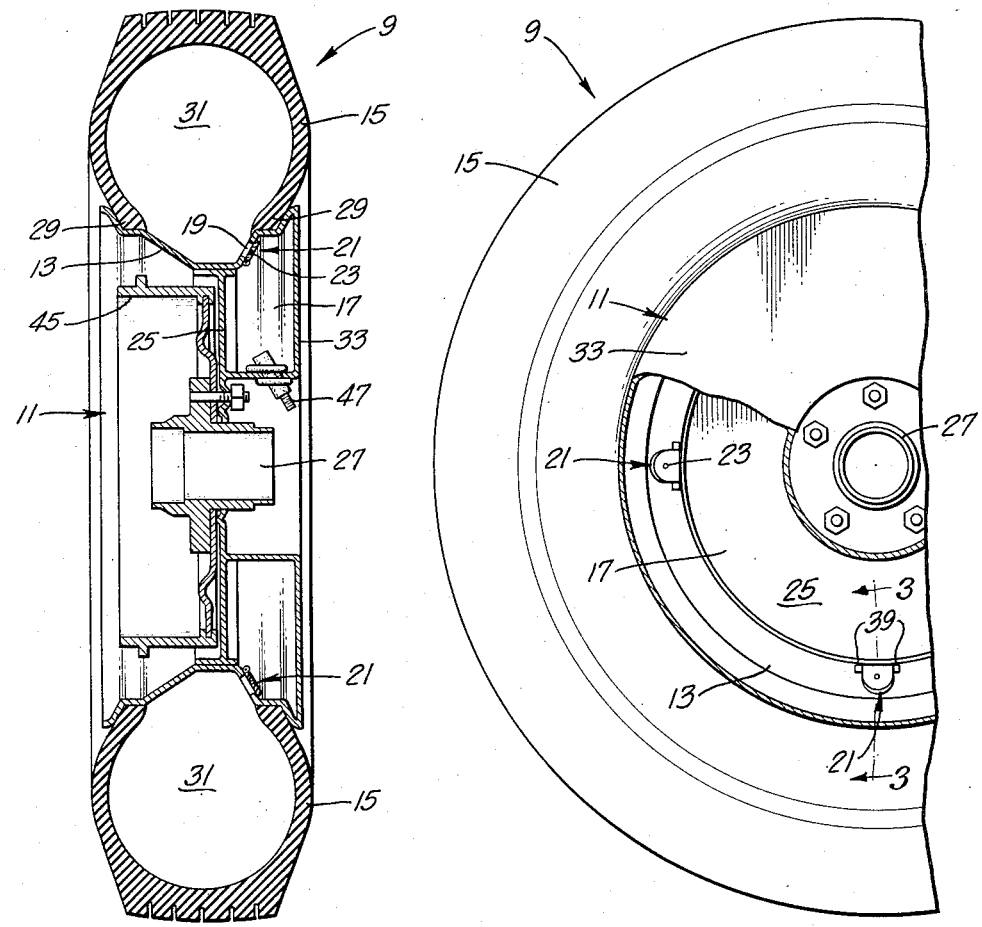
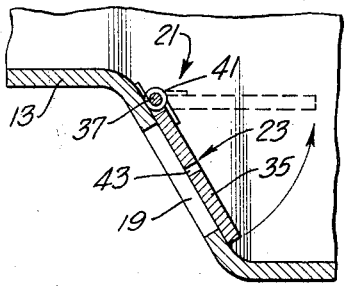
INVENTOR.
Andre J. M. Laurent
BY ECKHOFF & SLICK, Attys.
A member of the firm.

United States Patent Office 2,872,962
Patented Feb. 10, 1959

2,872,962

SHOCK CUSHIONING WHEEL

André J. M. Laurent, Los Alamos, Calif.

Application October 30, 1956, Serial No. 619,240

1 Claim. (Cl. 152—10)

This invention relates to vehicle wheels and more particularly to wheels utilizing pneumatic rubber tires to smooth out and cushion shock imposed by the impact of the wheel striking irregularities in the roadway.

The cushioning effect of pneumatic tires depends to a large extent upon the ability of the air contained within the tire to compress as the periphery of the tire is forced inwardly as the wheel strikes a bump. The work performed in compressing the entrapped air reduces the amount of energy passing to the vehicle in the form of road shock. More work is performed in compressing a large volume of air than a smaller one and hence the cushioning or shock absorbing characteristics of the tire are improved by increasing the volume of air contained therein. An even more important factor in securing a smooth ride is the rebound effect of the tire. When a tire hits an obstruction, the air is highly compressed locally near the point of impact. This highly compressed air then exerts an outward force on the tire, causing the vehicle to rebound. Thus, the mere provision of a tire having a large air volume does not fully solve the ride problem, but actually increases the rebound problem.

Accordingly, the present invention contemplates a wheel structure providing an auxiliary chamber for air connected to the interior of the tire by suitable passages. The flow of air between the tire and the auxiliary chamber is controlled so that sudden increases of pressure within the tire, as would be caused by striking a bump, will open the passages to the chamber and utilize the shock cushioning effect of the volume of air contained therein. To lessen the rebound effect, the passages then close and air is bled gradually from the chamber into the tire until their respective pressures are equalized. This structure accomplishes a smoothing out of road shock hitherto unobtainable with known wheel and tire construction.

It is, accordingly, an object of the present invention to provide a shock cushioning wheel structure in which local excesses of air pressure within the tire will be quickly relieved and temporarily trapped to smooth out and reduce the road shock transmitted to the vehicle axle.

Another object of the present invention is to provide a wheel structure of the character described which will selectively increase the effective volume of cushioning air in response to rapid increases in pressure within the tire.

A further object of the present invention is the provision of a wheel structure of the character described incorporating an air chamber formed to afford an equalized shock absorbing action around the entire circumference of the wheel.

A still further object of the present invention is to provide a shock cushioning wheel structure employing a reserve volume of air which is immediately available to draw off a portion of the air contained within the tire upon sudden rises of pressure therein, and which will slowly return such portion of air to the tire to equalize the pressure within the tire and the reserve volume.

Other objects and features of advantage will become apparent from a consideration of the following description and of the accompanying drawing forming a part of this specification.

With reference to said drawings:

Figure 1 is a vertical cross sectional view taken through the central axis of a shock cushioning wheel constructed in accordance with the present invention.

Figure 2 is a fragmentary side elevational view of the wheel of Figure 1, with portions of the structure broken away and shown in section.

Figure 3 is an enlarged fragmentary sectional view of a portion of the structure and is taken substantially on the plane of line 3—3 of Figure 2.

The shock cushioning wheel 9 of the present invention consists basically of a hub 11 having a peripheral flanged rim 13 mounting a pneumatic tire 15, an airtight chamber 17 on the hub having a passage 19 connecting the chamber 17 with tire 15, valve means 21 normally sealing the passage 19 and adapted to permit air flow therethrough in response to increased air pressure in the tire 15 as occasioned by road shocks, and means 23 for bleeding air from chamber 17 to tire 15 to gradually equalize the air pressures contained therein. While the wheel 9 may be used with any resilient tire adapted to contain a volume of any suitable cushioning fluid, the invention is particularly suited for use with pneumatic tires of the type known as "tubeless" tires in which the tire casing seals to the wheel rim and the rim cooperates with the casing to define the enclosed air space. As here shown, such a tire 15 is mounted on a rime 13 carried by a web portion 25 and bearing retainer 27 and comprising the hub 11. The bead portions 29 of the tire engage the opposite sides of the rim exposing a central portion thereof to the interior 31 of the tire.

The chamber 17 is preferably annular in shape and conveniently is formed integrally with the wheel hub 11. As may best be seen in Figures 1 and 2, a casing 33 is welded to and cooperates with the rim 13 and web 25 to define the annular chamber 17 concentric with the wheel. Desirably, a plurality of passages 19 are provided through the rim 13 and communicating with the chamber 17 and interior 31 of the tire. Four such passages 19 are here shown spaced circumferentially 90° from each other so as to equalize the cushioning effect of the structure over the whole circumference of the tire, although a larger or smaller number may be used.

The valve means 21 is here shown as consisting of flap valves 35 mounted over each of the passages 19 on shafts 37 supported by ears 39 formed on the rim 13. The flap valves 35 are mounted to swing from a first position closing off the passages 19, see Figure 3, to a second position opening the passage, as illustrated by the dotted lines of Figure 3, in response to pressures in the tire 15 higher than those in the chamber 17. Spring means 41 are provided in the form of a coil spring wound around the shafts 41 and pressing against the rim 13 and outer side of the flap valves 35 so as to bias the latter to their second, closed, position. Thus, the flap valves 35 are normally closed, but when the tire strikes a bump a local excess of pressure will occur at that point, and this will be relieved by the flap valves which will open rapidly in response to the increase of pressure in the tire.

At this point, the flap valves will snap shut, and the means 23 will take over to bleed the excess air from the chamber 17 back to the tire 15. The means 23 may consist of any suitable passage connecting the chamber and tire and having a cross sectional area considerably less than that of the passages 19. Preferably, the bleeder means 23 is incorporated in the flap valves 35 and consists of a small passage 43 formed through the center of each flap so as to communicate with the chamber 17 and the interior 31 of the tire by way of the passage 19.

The tire 15 may be inflated in the usual manner through an inflating valve mounted through the rim 13. However, in order to leave room for the usual brake drum 45 at the inner side of the wheel, the chamber 17 is preferably disposed at the outer side of the wheel. This disposition of the chamber effectively blocks off access to the normal position of the inflating valve which is therefore mounted through the casing 33, as shown in Figure 1. It is noted in this connection that the four bleeder passages 43 permit the air entering the chamber 17 through the inflating valve 47 to pass into and inflate the tire.

While the salient features of this invention have been described in detail with respect to certain embodiments thereof, it will, of course, be apparent that certain modifications may be made within the spirit and scope of this invention, and it is not desired, therefore, to limit the invention to the exact details shown except insofar as they may be defined in the following claim.

I claim:

A shock cushioning vehicle wheel comprising a hub having a peripheral flanged rim adapted for mounting a tubeless pneumatic tire, said hub being formed to provide an annular fluid tight chamber and a plurality of circumferentially spaced passages communicating with said chamber and terminating at said rim for communication with the interior of said tire, a plurality of valve members hingeably mounted along one side thereof on shafts secured to said hub for swinging movement between first and second positions closing off and opening said passages respectively, a helical spring wound about each of said shafts having an extension perpendicular to the axis of said spring at one end thereof lying against each of said valves and having a second extension perpendicular to the axis of said spring at the second end thereof lying against said hub resiliently biasing said members toward said first position, said members being adapted to swing toward said second position against the bias of said spring means in response to increases in fluid pressure in said tire, each of said members being formed with a bleeder passage therethrough smaller than said first named passage for slowly equalizing fluid pressures in said chamber and tire, and valve means in said chamber opening to the exterior thereof for the addition of fluid thereto.

References Cited in the file of this patent

UNITED STATES PATENTS

| | | |
|---|---|---|
| 1,470,938 | Semery | Oct. 16, 1923 |
| 1,781,366 | Campula | Nov. 11, 1930 |
| 1,786,101 | Welch | Dec. 23, 1930 |
| 2,268,806 | Curtis | Jan. 6, 1942 |